March 7, 1933.  G. A. HOLCOMBE  1,900,557
EXHIBITING APPARATUS
Filed Oct. 7, 1929
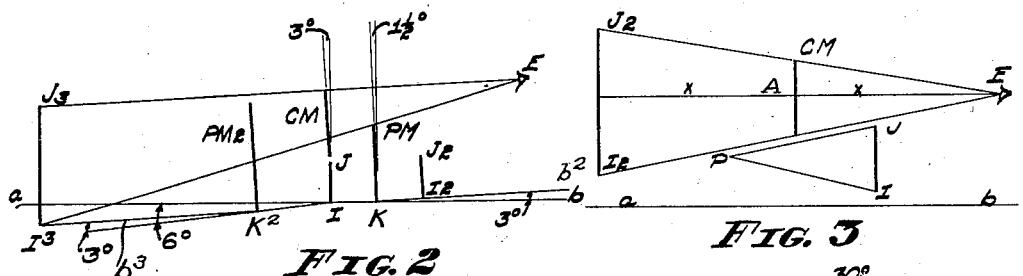
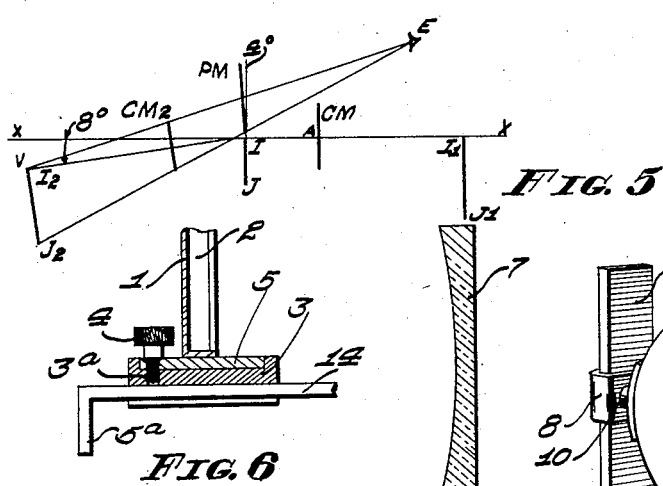
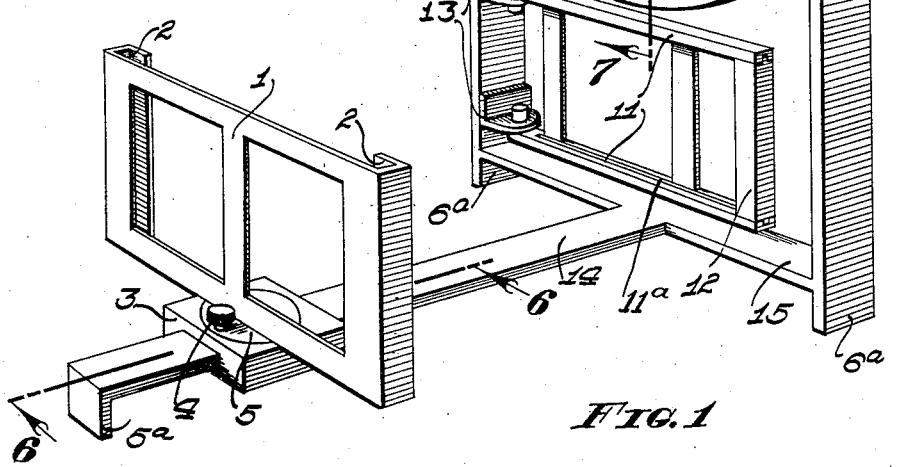
INVENTOR.
GEORGE A. HOLCOMBE
BY A.B. Bowman
ATTORNEY Patented Mar. 7, 1933

1,900,557

UNITED STATES PATENT OFFICE

GEORGE A. HOLCOMBE, OF SAN DIEGO, CALIFORNIA

EXHIBITING APPARATUS

Application filed October 7, 1929. Serial No. 397,761.

My invention relates to an exhibiting apparatus, and the objects of my invention are: First, to provide an exhibiting apparatus for the exhibition of lantern slides or stills; second, to provide an apparatus of this class for the exhibition of motion pictures; third, to provide an apparatus of this class for the exhibition of photographs or halftone reproductions thereof; fourth, to provide an apparatus of this class adapted for viewing various objects by means of reflection and magnification and by means of a concave reflecting surface or concave mirror; fifth, to provide an apparatus of this class which is readily adaptable for the various purposes hereinbefore mentioned; sixth, to provide an exhibiting apparatus of this class which, in addition to showing a magnified image of a lantern slide, still, motion picture, photograph or reproduction thereof, will also impart to such magnified image an appearance of being in relief; seventh, to provide an apparatus of this class which is adjustable throughout, and eighth, to provide an apparatus of this class which is simple, economical of construction, durable, efficient in its action and adaptation.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a perspective view of my exhibiting apparatus in its assembled relation ready for use; Fig. 2 is a diagrammatical view showing the lines of reflection of my apparatus and the mode of operation when using two mirrors, one concave and one plane mirror for reflecting purposes; Fig. 3 is a similar view showing the application of the same for the projection of stills or motion pictures or the exhibition of objects where only one reversal is required; Fig. 4 is a diagrammatical view which shows the geometrical adjustment of the two mirrors when vertical pictures are shown; Fig. 5 is a diagrammatical view showing the geometrical position of the magnified image when the two mirrors are interchanged, that is, when the plane mirror becomes the exhibition mirror instead of the concave mirror; Fig. 6 is a fragmentary sectional view through 6—6 of Fig. 1; and Fig. 7 is a substantially diagrammatical sectional view through 7—7 of Fig. 1.

Similar characters of reference refer to similar parts and portions throughout the several views of the drawing.

Frame 1, receiving grooves 2, sliding platform 3, screw 4, revoluble support 5, uprights 6, concave mirror 7, mirror slide supports 8 and 9, shaft 10, projecting table 11, projecting table vertical slide 12, journal plates 13, main longitudinal bar 14, and transverse bar 15, constitute the principal parts and portions of my exhibiting apparatus.

The frame 1 is preferably rectangular in shape and is provided with channel shaped side edges forming grooves 2 at the sides for the purpose of receiving a screen or a mirror. These grooves 2 are of sufficient width to permit the picture or mirror to be positioned on a slight angle in the grooves, as desired. This frame 1 is secured at its lower side on a plate 5 which is revolubly mounted in a recess in the upper side of the block 3 so that the frame member 1 may be turned to varying positions, as desired, relatively to the block 3, and this plate 5 is provided with a screw 4, which is adapted to screw into any one of several threaded holes 3a provided in the lower surface of the recess in the block 3 for holding the plate in any position desired when said screw is tightened in the member 5. If desired, the frame 1 and plate 5 may be removed from the block 3.

The block 3 is provided with grooves in its lower side which fit over the member 14 so that this block 3 may be moved longitudinally along said bar 14 to any desired position carrying with it the frame 1. This bar 14 is provided at one end with a downwardly turned portion 5a which forms a base or support for the outer end of the apparatus. Secured to the opposite end of the member 14 is a bar 15 which extends at right angles thereto or transversely with the apparatus, and secured to the opposite ends of this bar 15 are the uprights 6 which extend below the same at 6a forming a base for this end of the apparatus.

Mounted between these uprights near their upper ends is a concave mirror 7 which is mounted on shafts 10 which are pivoted in the supports 8 and 9 so that the mirror may be tilted on the shafts 10 to varying positions and these supports 8 and 9 are held in position on the uprights 6 by means of screws 9a, the inner ends of which extend into holes 6b in the uprights 6, thus providing means for raising and lowering the mirror 7 relative to the uprights 6.

Mounted on the one end of the uprights 6 on one side is a pair of plates 13 which are provided with lugs which extend outwardly and in which are mounted the ends of the frame members 11 and at the opposite end of these frame members is a vertical frame 12 which is shiftable upon the frame members 11. The lower member 11 and the frame member 12 are provided with grooves 11a on their upper and inner sides adapted to receive the edges of any objects placed thereon.

The purpose of the diagrammatical views 2 to 5, inclusive, is to show how an observer from point E will view the magnified image of an object, a photograph or projected image represented by IJ, which is reflected and magnified by the concave mirror CM and indicates the manner by which the observer may control the magnification and shift of position of the magnified image in the center of the concave mirror.

In the diagrammatical view Fig. 2 the line $ab$ represents the base upon which the apparatus is resting and corresponds to the bar 14 of Fig. 1 of the drawing. CM is a section of the meridian plane of a concave spherical reflecting surface and represents the concave mirror 7 which is, for the purpose of illustration, 8" in diameter. Its radius of curvature is 36". Its focal length is 18". CM is tilted to the left of the perpendicular at an angle of three degrees. IJ at right angles to $ab$, rests on $ab$ at I and represents a photograph 5" high. PM is a plane mirror 9" high and resting on $ab$ at K to the right of IJ facing IJ and CM. PM is tilted to the left of the perpendicular one and one-half degrees or half the number of degrees that CM is tilted. The first reflection of IJ will be in PM as at I2—J2 which is 6" behind PM or 12" in front of CM. Since PM is tilted one and one-half degrees that portion of $ab$ beyond K, or K$b$, will move upwardly three degrees, so K$b$ becomes K—$b$2. Since the focal length of CM is 18", the magnification ratio of I2—J2, 12" in front of CM and 6" from its focal point is determined by the formula $-f/x$, where $f$ is the focal length and $x$ the distance between $f$ and the object. Hence I2—J2 will be magnified three diameters, ($f/x$ equals 18/6 equals 3). The distance of the reflected and magnified image of I2—J2 behind CM will be 36" (3 × 12). Now, since CM is tilted three degrees all that portion of $ab$ lying in front of and reflected by CM will be deflected downwardly six degrees. First the point K lying 6" in front of CM will take its own magnification ratio (18/12 equals 1.5). Hence K2 will be 9" behind CM and PM2 at this point is the magnified image of the plane mirror and is 13.5" high as shown, and K—$b$2 will be reflected as K2—$b$3, making an angle of three degrees with the base at K2. Since K2 is 9" behind CM the final magnified image of IJ will be 27" further along the line K2—$b$3 making 36" in all. Therefore, I3—J3, 36" behind CM, represents the final magnified image of IJ and is 15" high and parallel to CM.

The observer from the point E by tilting the two mirrors CM and PM at the required angle, determined by visual observation, thereby places the final magnified image in the center of the exhibiting mirror CM. The observer sees the image through two mirrors, first through CM and then through PM2. If the plane mirror is tilted half that of the exhibiting mirror, then the final magnified image will occupy a plane parallel to the concave mirror and be practically free from distortion.

The diagrammatical view, Fig. 3, serves a double purpose, illustrating the application of this apparatus to the projection of stills or motion pictures or the exhibition of objects where only one reversal is required. First, for projection purposes, the line $ab$ represents the base upon which the apparatus is resting. CM is a spherical concave mirror 10" in diameter, XX the axis, A the vertex. CM has a radius of 36", a focal length of 18". The bottom edge of CM is raised 8" above the base $ab$. IJ represents the projection table or screen placed 10" in front of CM and parallel to it. The point P represents the position of the projection lens. The image at IJ is projected from behind and below CM and if the positive is placed in the projection apparatus with the film side facing the light source, then the projected image on IJ will be incorrect laterally, but the magnified and reflected image will be correct. I2—J2 represents the magnified image as seen in the concave mirror from the point E. In this Fig. 3 the mirrors are not tilted and the observer at E would be viewing the image from a point close to, or exactly on, the axis of the concave mirror. However, if the position of the observer, or observers, requires a different position for the magnified image, the tilting may be done as indicated in Fig. 2, both the mirror and projection table being tilted at angles that will center the magnified image in the middle of the concave mirror, but in this case both are tilted at the same angle in order that the screen will remain parallel to the mirror. If IJ represents an object such as manufactured goods, or samples, laboratory specimens, etc., then the mirror only is tilted just sufficient to center the magnified image in the concave mirror and the distance of IJ from CM will determine the magnification ratio, provided IJ remains at a distance from CM less than its focal length.

The diagrammatical view, Fig. 4, illustrates geometrically the adjustment of the two mirrors when vertical pictures are shown. CM is the concave mirror; PM1 the plane mirror parallel to the former before the adjustment. The vertical picture instead of being placed directly beneath the concave mirror is placed at one side and inclined toward the other mirror at an angle of thirty degrees. IJ, the picture, forms an angle of thirty degrees with XY and XY represents an imaginary line parallel to the axis of CM. PM1 is then moved towards CM and IJ to an angle of thirty degrees, hence I2—J2 will be the reflection of IJ in PM, which is the position required of the first reflection parallel to CM in order to be reflected and magnified without distortion.

Fig. 5 illustrates geometrically the position of the magnified image when the two mirrors are interchanged. That is, when the plane mirror becomes the exhibiting mirror instead of the concave mirror. CM is the concave spherical mirror having a focal length of 18″. XX is the axis. A the vertex of CM. Its diameter is 8″. IJ represents a photograph 5″ high with its upper edge touching the axis and placed 9″ in front of CM. Its magnification ratio then will be two diameters and I1—J1, 18″ behind CM, represents the first reflection magnified by CM which the plane mirror PM will present to the observer at E. The plane mirror PM is tilted backwardly four degrees, thereby lowering that portion of the axis behind PM and reflected by PM through an angle of eight degrees. The angle XIV is eight degrees. CM2 is the reflection of CM and PM and is 8″ behind PM and is at right angles to IV. Hence the final reflection and magnified image of IJ will be 18″ behind CM2 with its upper edge touching IV and at right angles to IV. The observer at E will view I2—J2 first through PM, thence through CM2. Both the final image and CM2 are parallel, which is the position required to eliminate distortion.

It will be noted that the steps are identical in Figs. 2 and 5. Each, however, has its particular advantage according to the focal length of the concave mirror. The Fig. 2 represents the best arrangement for pictures of postcard size and larger when the focal length is at least 18″. While for smaller pictures with a mirror having a shorter focal length than 18″, the diagrammatical view Fig. 5 is the better.

It will be noted that the apparatus shown in Fig. 1, provides for projections as disclosed in Figs. 2 to 5, inclusive; it being noted that the frame 11 may be moved backwardly out of the way for shifting the mirror 7 up and down and when this frame is not in use, or, if desired may be removable from the members 13.

The operation of my exhibiting apparatus is as follows: When used for projection purposes, by removing the frame 11 or turning it out of the way, the projection apparatus is then placed behind the concave mirror with the lens below the lower edge of the mirror and above the cross piece 15. Just sufficient throw is allowed to cover the screen. A section of the projection screen material is placed in the frame 1 and this frame is moved along the bar 14 until the desired magnification is obtained. The magnification will be obtained when the projected image lies between the mirror and its focal point. If only a few persons are viewing the image, then the largest magnification possible may be used; but if a larger number are viewing it, then a smaller magnification must be used in order that those that are farthest removed from the apparatus may see the entire image behind the mirror. The position of the magnified image may be adjusted to suit the eye level of the observer; the image is lowered by tilting the top of the concave mirror backward, and is raised by tilting the top of the mirror forward. The film, still, or lantern slide must be projected with the film side of the positive facing the light source in order that the final image will be correct laterally as the mirror will provide but one reversal.

When using the apparatus for exhibiting horizontal photographs or reproductions of the same, the picture is placed in a groove of the projection table 11 and the position is as shown in Fig. 1 of the drawings, and the sliding member 12 brought in contact with it, which provides a second groove to assist in holding the picture. The upper edge of the picture should be close to the lower edge of the mirror. The amount of magnification is obtained by sliding the frame 1 (which has in this case a plane mirror) in the groove 2 along the cross piece 14 and the image is centered in the concave mirror by tilting either of both mirrors, as explained in the above paragraph.

When the apparatus is used for exhibiting vertical pictures, the following operation is desirable: If a long, vertical picture is placed on the projection table 11, when in the position shown in Fig. 1 of the drawing, the lower edge of the picture will be so far removed from the axis of the mirror that both spherical distortion and curvature of the field will be very noticeable. Therefore, the frame 1 is swung out forming an angle of one hundred twenty degrees with the concave mirror or thirty degrees with the axis. Then the frame 1 containing the plane mirror is moved toward the picture through an angle of thirty degrees. This will bring the first reflection in the plane mirror parallel with the concave mirror.

When the apparatus is used for exhibiting objects which are not pictures, such as ore samples, manufactured goods, laboratory samples, etc., where the object may be seen as a whole and magnified, the frame 1 is removed from the platform by loosening and removing the bolt 5, then leaving the platform clear. Then the platform may be used to support the object to be exhibited. The reflected image will be reversed laterally. If two reversals are required, then the object is placed below the concave mirror on the cross piece 15, after turning the projection table out of the way, and the plane mirror in frame 1 used for the exhibition of the object.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an exhibiting apparatus, a frame including a pair of spaced apart uprights, a concave mirror pivotally supported on a horizontal axis positioned intermediate its upper and lower sides between said uprights, a plane mirror receiving-frame supported on said frame relative to, and facing, said concave mirror, at a distance from said concave mirror less than its focal length, and another frame, or picture holder, pivotally supported on said frame slightly below said concave mirror with its front facing the front of said plane mirror frame.

2. In an exhibiting apparatus, a frame including a pair of spaced apart uprights, a concave mirror pivotally supported on a horizontal axis positioned intermediate its upper and lower sides between said uprights, means for adjusting said concave mirror in upwardly and downwardly shifted positions, a plane mirror receiving-frame shiftably and rotatably supported on said frame relative to, and facing, said concave mirror, said frame being shiftable from said concave mirror through a distance less than its focal length, and another frame, or picture holder, pivotally supported on said frame slightly below said concave mirror and with its front facing the front of said plane mirror frame.

3. In an apparatus of the class described a main frame, a tiltable concave mirror mounted for adjustment upwardly and downwardly on uprights secured to said main frame, a rotatably and shiftably mounted frame provided with slots for receiving a plane mirror, positioned facing said concave mirror, and on said main frame, means for securing said rotatable frame in said adjusted position, and an opaque object receiving frame pivotally supported on one end on one of the uprights supporting said concave mirror slightly below said concave mirror and facing the front of said plane mirror receiving-frame.

4. In an exhibiting apparatus, a tiltable concave mirror, a plane mirror receiving frame shiftably and rotatably supported relatively to said concave mirror so that it faces said concave mirror, means for supporting and adjusting said concave mirror in upwardly and downwardly shifted positions and an opaque object receiving and supporting frame pivotally supported at one end slightly below said concave mirror, and its front facing the front of said plane mirror receiving frame.

5. An exhibiting apparatus consisting of a frame, a concave mirror tiltably mounted thereon, a plane mirror receiving frame shiftably mounted on said first-mentioned frame so that said plane mirror faces said concave mirror at a distance less than its focal length therefrom, and another frame for an opaque picture-holder for holding a picture facing said plane mirror, positioned slightly below said concave mirror on said frame.

6. An exhibiting apparatus consisting of a frame, a concave mirror tiltably mounted thereon, a plane mirror shiftably mounted facing said concave mirror positioned at a distance from said concave mirror less than the focal length of said concave mirror, and an opaque picture frame shiftably mounted on said first-mentioned frame facing said plane mirror and positioned slightly below said concave mirror.

In testimony whereof, I have hereunto set my hand at San Diego, California, this 28th day of September, 1929.

GEORGE A. HOLCOMBE.